United States Patent
Droste et al.

(10) Patent No.: US 10,312,554 B2
(45) Date of Patent: Jun. 4, 2019

(54) BATTERY COOLING CHANNEL WITH INTEGRATED CELL RETENTION FEATURES

(71) Applicant: FORD GLOBAL TECHNOLOGIES, LLC, Dearborn, MI (US)

(72) Inventors: Steve Droste, Ypsilanti, MI (US); Kevin A. Montgomery, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 192 days.

(21) Appl. No.: 14/165,888

(22) Filed: Jan. 28, 2014

(65) Prior Publication Data
US 2015/0214584 A1    Jul. 30, 2015

(51) Int. Cl.
| | |
|---|---|
| *H01M 10/6557* | (2014.01) |
| *H01M 10/48* | (2006.01) |
| *H01M 2/10* | (2006.01) |
| *H01M 10/625* | (2014.01) |
| *H01M 10/643* | (2014.01) |
| *H01M 10/613* | (2014.01) |

(52) U.S. Cl.
CPC ....... *H01M 10/482* (2013.01); *H01M 2/1077* (2013.01); *H01M 10/613* (2015.04); *H01M 10/625* (2015.04); *H01M 10/643* (2015.04); *H01M 10/6557* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 7,775,810 B2 * | 8/2010 | Lawrence | H01M 2/105 429/93 |
| 7,968,222 B2 * | 6/2011 | Kang | H01M 2/105 429/100 |
| 8,475,952 B2 | 7/2013 | Yasui et al. | |
| 2009/0148754 A1 | 6/2009 | Marchio et al. | |
| 2010/0104938 A1 * | 4/2010 | Hermann | H01M 2/1077 429/120 |
| 2012/0082887 A1 * | 4/2012 | Ninomiya | H01G 9/08 429/159 |
| 2012/0214034 A1 | 8/2012 | Minokawa | |
| 2013/0189556 A1 | 7/2013 | Toepfer | |
| 2013/0196184 A1 | 8/2013 | Faass et al. | |
| 2013/0316203 A1 * | 11/2013 | Hsiao | H01M 10/5004 429/83 |
| 2014/0087220 A1 * | 3/2014 | Seiler-Thull | H01M 2/1077 429/83 |

FOREIGN PATENT DOCUMENTS

CN    101621142 A    1/2010

OTHER PUBLICATIONS

Dictionary.com Unabridged Based on the Random House Dictionary, © Random House, Inc. 2018.*

* cited by examiner

*Primary Examiner* — Ula C Ruddock
*Assistant Examiner* — Thomas H. Parsons
(74) *Attorney, Agent, or Firm* — Carlson, Gaskey & Olds (57) ABSTRACT

A battery cooling and retainer assembly according to an exemplary aspect of the present disclosure includes, among other things, a first retainer section that includes a first retention feature, a second retainer section that includes a second retention feature, and a cooling channel disposed between the first retainer section and the second retainer section.

24 Claims, 6 Drawing Sheets

BATTERY COOLING CHANNEL WITH INTEGRATED CELL RETENTION FEATURES

TECHNICAL FIELD

This disclosure relates to an electrified vehicle, and more particularly, but not exclusively, to a battery cooling channel having integrated cell retention features for simultaneously cooling and retaining the battery cells of a battery module.

BACKGROUND

Electrified vehicles such as hybrid electric vehicles (HEV's), plug-in hybrid electric vehicles (PHEV's), battery electric vehicles (BEV's), or fuel cell vehicles differ from conventional engine vehicles in that they are powered by one or more electric machines (i.e., electric motors and/or generators) instead of or in addition to an internal combustion engine. High voltage current for powering electric machines is typically supplied by a high voltage traction battery pack that stores energy.

Electrified vehicle battery packs are made up of multiple battery modules. The battery cells of such battery modules may need thermally managed to remove excess heat out of the battery pack. Some battery pack designs may additionally require securely retaining the battery cells relative to one another to achieve a proper electrical connection.

SUMMARY

A battery cooling and retainer assembly according to an exemplary aspect of the present disclosure includes, among other things, a first retainer section that includes a first retention feature, a second retainer section that includes a second retention feature, and a cooling channel disposed between the first retainer section and the second retainer section.

In a further non-limiting embodiment of the foregoing assembly, the first retainer section is disposed on a first side of a cooling housing and the second retainer section is disposed on a second, opposite side of the cooling housing.

In a further non-limiting embodiment of either of the foregoing assemblies, the cooling channel extends inside of the cooling housing.

In a further non-limiting embodiment of any of the foregoing assemblies, the first retention feature and the second retention feature include spaced apart arms that circumscribe a pocket.

In a further non-limiting embodiment of any of the foregoing assemblies, a shelf extends between the spaced apart arms.

In a further non-limiting embodiment of any of the foregoing assemblies, the pocket in semi-cylindrical shaped.

In a further non-limiting embodiment of any of the foregoing assemblies, the spaced apart arms are flexible between a collapsed position and a flexed position.

In a further non-limiting embodiment of any of the foregoing assemblies, the first retainer section and the second retainer section include a plurality of retention features that are configured to hold battery cells.

In a further non-limiting embodiment of any of the foregoing assemblies, the cooling channel includes a coolant inlet and a coolant outlet.

In a further non-limiting embodiment of any of the foregoing assemblies, the cooling channel extends along an undulated path.

In a further non-limiting embodiment of any of the foregoing assemblies, the undulated path includes a plurality of alternating narrow regions and expanded regions that extend between opposing interior walls of the first retainer section and the second retainer section.

In a further non-limiting embodiment of any of the foregoing assemblies, the cooling channel extends along a longitudinal axis of the assembly.

A battery module according to another exemplary aspect of the present disclosure includes, among other things, a battery cell and a battery cooling and retainer assembly configured to both hold the battery cell and cool the battery cell with a coolant that is communicated inside of the battery cooling and retainer assembly.

In a further non-limiting embodiment of the foregoing battery module, the battery cooling and retainer assembly includes a first retainer section, a second retainer section and a cooling channel between the first retainer section and the second retainer section.

In a further non-limiting embodiment of either of the foregoing battery modules, at least one of the first retainer section and the second retainer section includes a retention feature that includes spaced apart arms that hold the battery cell.

In a further non-limiting embodiment of any of the foregoing battery modules, the cooling channel extends along a longitudinal axis inside of a cooling housing of the battery cooling and retainer assembly.

In a further non-limiting embodiment of any of the foregoing battery modules, a plurality of battery cells are retained within a plurality of pockets of the battery cooling and retainer assembly.

In a further non-limiting embodiment of any of the foregoing battery modules, the coolant is communicated along an undulated path inside of the battery cooling and retainer assembly.

In a further non-limiting embodiment of any of the foregoing battery modules, the battery cell cooling and retainer assembly is a monolithic, molded assembly.

An electrified vehicle according to another exemplary aspect of the present disclosure includes, among other things, a battery pack that includes a plurality of battery modules. At least one of the plurality of battery module includes a plurality of battery cells and a battery cooling and retainer assembly that includes a cooling channel and integrated retention features.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a battery cooling and retainer assembly for a battery module that can accommodate one or more battery cells. The battery cooling and retainer assembly includes a cooling channel as well as integrated battery cell retention features. In other words, the battery cooling and retainer assembly is configured to simultaneously cool and retain battery cells of the battery module in a single, monolithic part. These and other features are discussed in greater detail herein.

Figure 1:
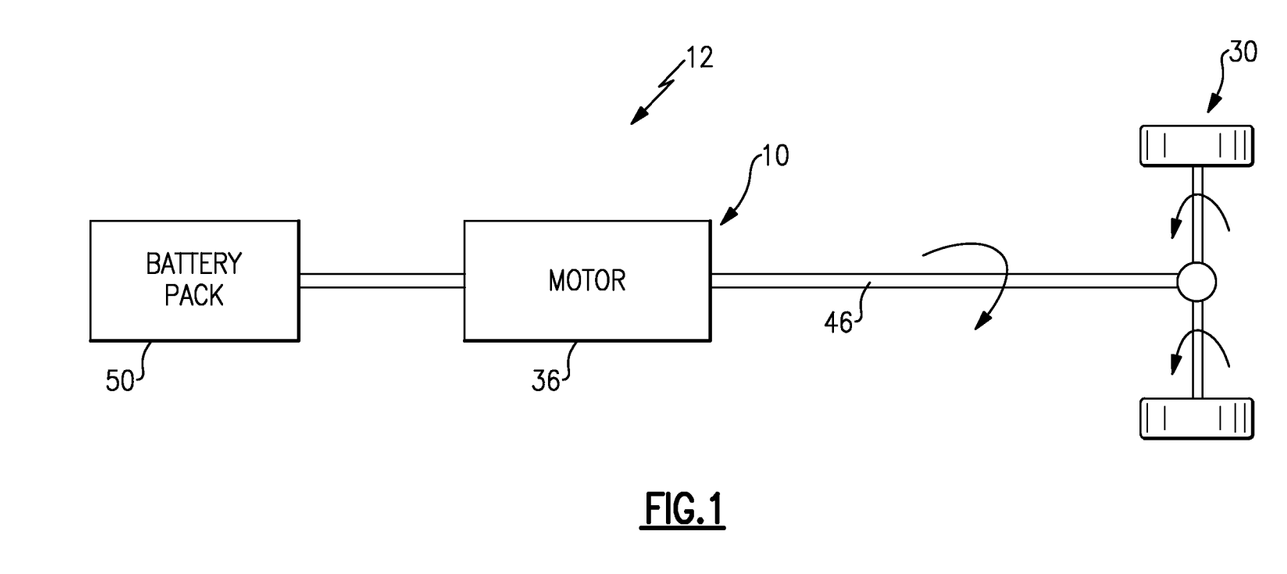
FIG. 1 schematically illustrates a powertrain of an electrified vehicle.

FIG. 1 schematically illustrates a powertrain 10 of an electrified vehicle 12. The electrified vehicle 12 may be a HEV, PHEV, BEV, or any other vehicle. In other words, this disclosure is not limited to any particular type of electrified vehicle.

The powertrain 10 includes a drive system having at least a motor 36 (i.e., an electric machine) and a battery pack 50. The battery pack 50 may include a high voltage battery that is capable of outputting electrical power to operate the motor 36. Although not shown in FIG. 1, the battery pack 50 may be made up of multiple battery modules that are electrically connected to one another.

The drive system generates torque to drive one or more sets of vehicle drive wheels 30 of the electrified vehicle 12. For example, the motor 36 can powered by the battery pack 50 and employed to electrically drive the vehicle drive wheels 30 by outputting torque to a shaft 46. Of course, this view is highly schematic. It should be appreciated that the powertrain 10 of the electrified vehicle 12 could employ additional components, including but not limited to, an internal combustion engine, a generator, a power transfer unit, and one or more control systems.

Figure 2A:
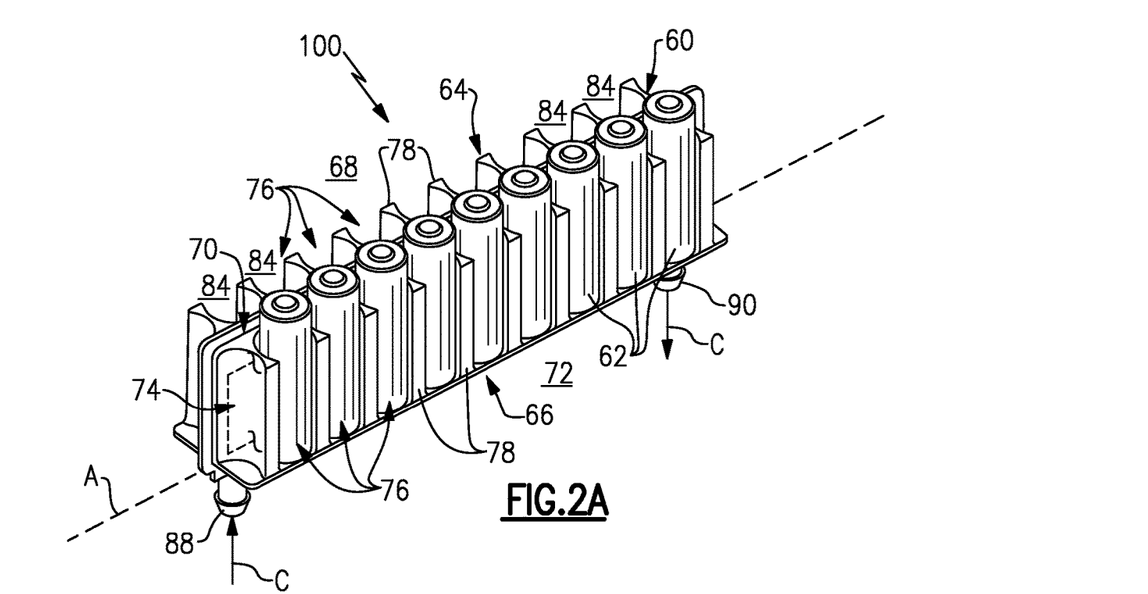
FIGS. 2A and 2B illustrate a battery cooling and retainer assembly of a battery module.
Figure 2B:
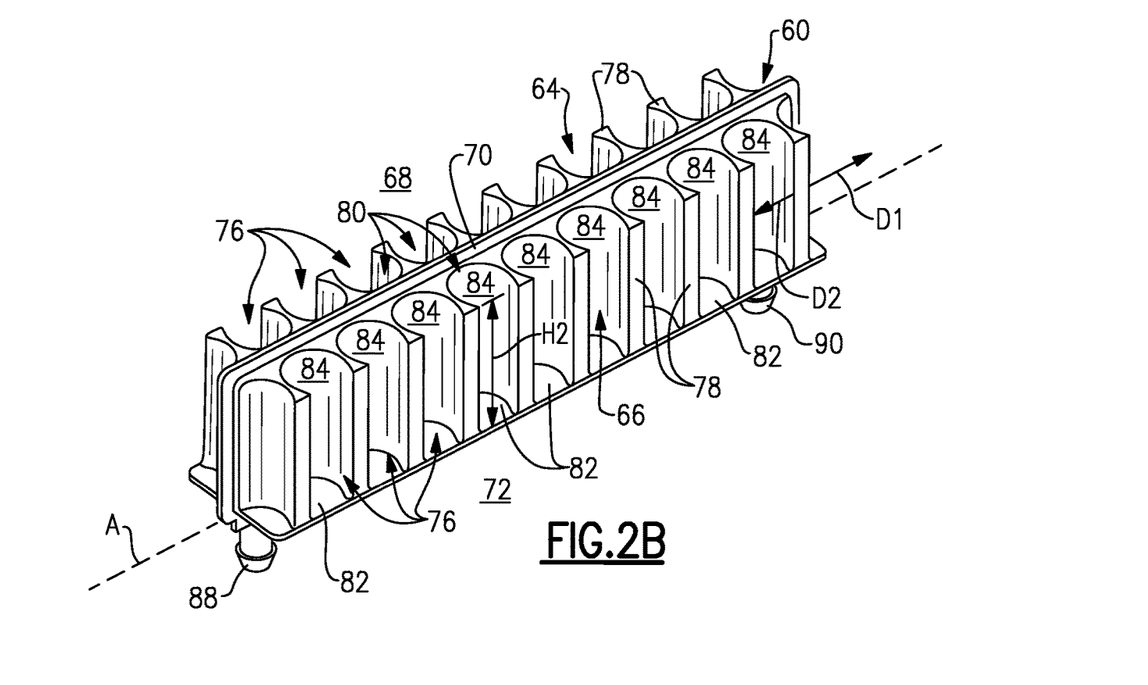
Figure 3:
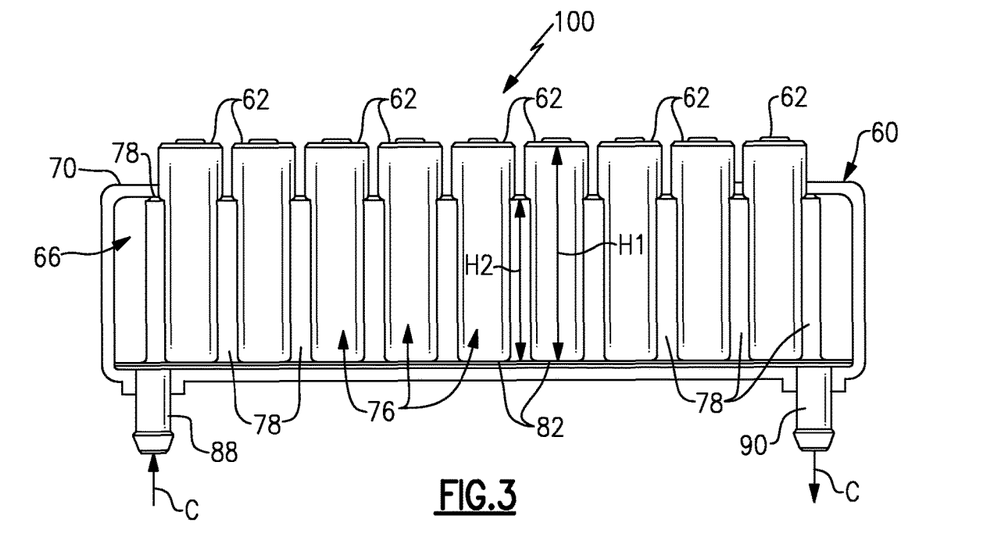
FIG. 3 is a front view of the battery cooling and retainer assembly of FIG. 2.

FIGS. 2A, 2B and 3 illustrate a battery cooling and retainer assembly (hereinafter "assembly") 60. The assembly 60 may be part of a battery module 100 that includes one or more battery cells 62. One or more of such battery modules 100 may make up the battery pack 50 illustrated in FIG. 1. The battery cells 62 of the battery module 100 are illustrated in FIGS. 2A and 3 but are omitted in FIG. 2B to better illustrate certain features of the assembly 60.

The assembly 60 is scalable in size to accommodate any number of battery cells 62 and is not necessarily limited to the size, shape and configuration of this illustrated embodiment. For example, the assembly 60 could accommodate either a single battery cell 62 or a multitude of battery cells 62 within the scope of this disclosure.

The assembly 60 may be a single piece, unitary part. For example, the assembly 60 may be a monolithic structure. In one non-limiting embodiment, the assembly 60 is an injection molded plastic part. In another embodiment, the assembly 60 is a blow molded plastic part (see FIG. 7). However, the assembly 60 could be constructed using other manufacturing techniques and other materials within the scope of this disclosure.

The assembly 60 may include a first retainer section 64 and a second retainer section 66 that extend along a longitudinal axis A of the assembly 60. The first retainer section 64 is disposed on a first side 68 of a cooling housing 70 and the second retainer section 66 is disposed on a second, opposite side 72 of the cooling housing 70. The cooling housing 70 houses a cooling channel 74 (shown in phantom lines in FIG. 2A and is best illustrated in the cross-sectional views of FIGS. 5 and 6) that extends inside of the cooling housing 70. In other words, in one embodiment, the cooling channel 74 is an internal cooling passage disposed inside of the assembly 60.

The cooling channel 74 includes a coolant inlet 88 and a coolant outlet 90. The coolant inlet 88 feeds coolant C into the cooling channel 74 and the coolant outlet 90 expels the coolant C from the cooling channel 74 (see FIGS. 2A and 3).

Both the first retainer section 64 and the second retainer section 66 may include one or more retention features 76 for positioning and holding the battery cells 62 of the battery module 100. The retention features 76 include spaced apart arms 78 that extend in a direction away from the cooling housing 70 (i.e., transverse to the longitudinal axis A). The spaced apart arms 78 partially circumscribe a pocket 84 that is sized to receive a battery cell 62.

In one embodiment, the spaced apart arms 78 vertically span across a distance between an open top 80 and a shelf 82 (see FIG. 2B). The shelves 82 extend horizontally between adjacent spaced apart arms 78 to positively locate the battery cells 62 at a common height H1. The height H1 may be greater than a height H2 of the spaced apart arms 78 between the open tops 80 and the shelves 82 (see FIG. 3).

In one embodiment, the pockets 84 are semi-cylindrical shaped to accommodate a corresponding cylindrical shaped battery cell 62. However, the pockets 84 may be shaped in any other manner to accommodate battery cells 62 of varying sizes, shapes and configurations.

In one non-limiting embodiment, as is illustrated in FIG. 2B, the spaced apart arms 78 are flexible between a collapsed position and a flexed position such that the battery cells 62 may be snap-fit onto the assembly 60. The spaced apart arms 78 may flex in a first direction D1 to move to the flexed position (in order to receive a battery cell 62) and a second, opposite direction D2 to move to the collapsed position. In the collapsed position, the spaced apart arms 78 may act to squeeze (i.e., apply a compressive force against) the battery cells 62 such that the battery cells 62 are held securely in place.

Figure 4:
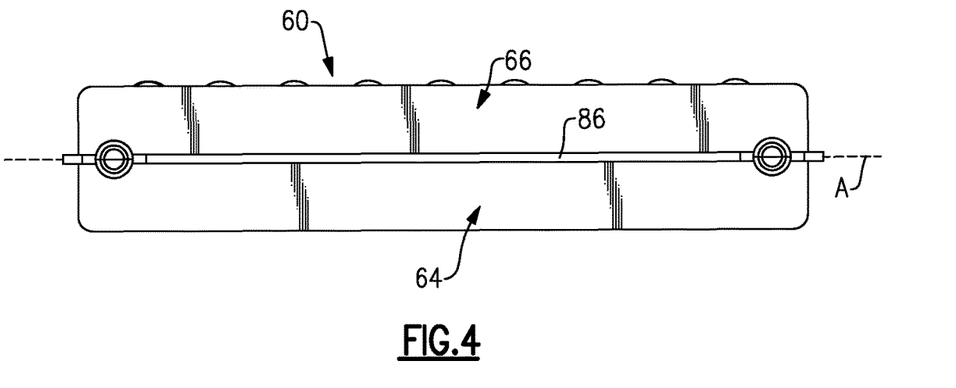
FIG. 4 is a bottom view of the battery cooling and retainer assembly of FIG. 2.

FIG. 4 illustrates a bottom view of the assembly 60. The first retainer section 64 and the second retainer section 66 may meet together at a seam 86 of the assembly 60. In one non-limiting manufacturing method, the first retainer section 64 and the second retainer section 66 are injection molded (or blow molded) as separate halves and subsequently fused together at the seam 86 via an ultrasonic welding procedure to form the monolithic assembly 60. Alternatively, the assembly 60 may be molded as a single, unitary piece without any necessary secondary assembly operations.

Figure 5:
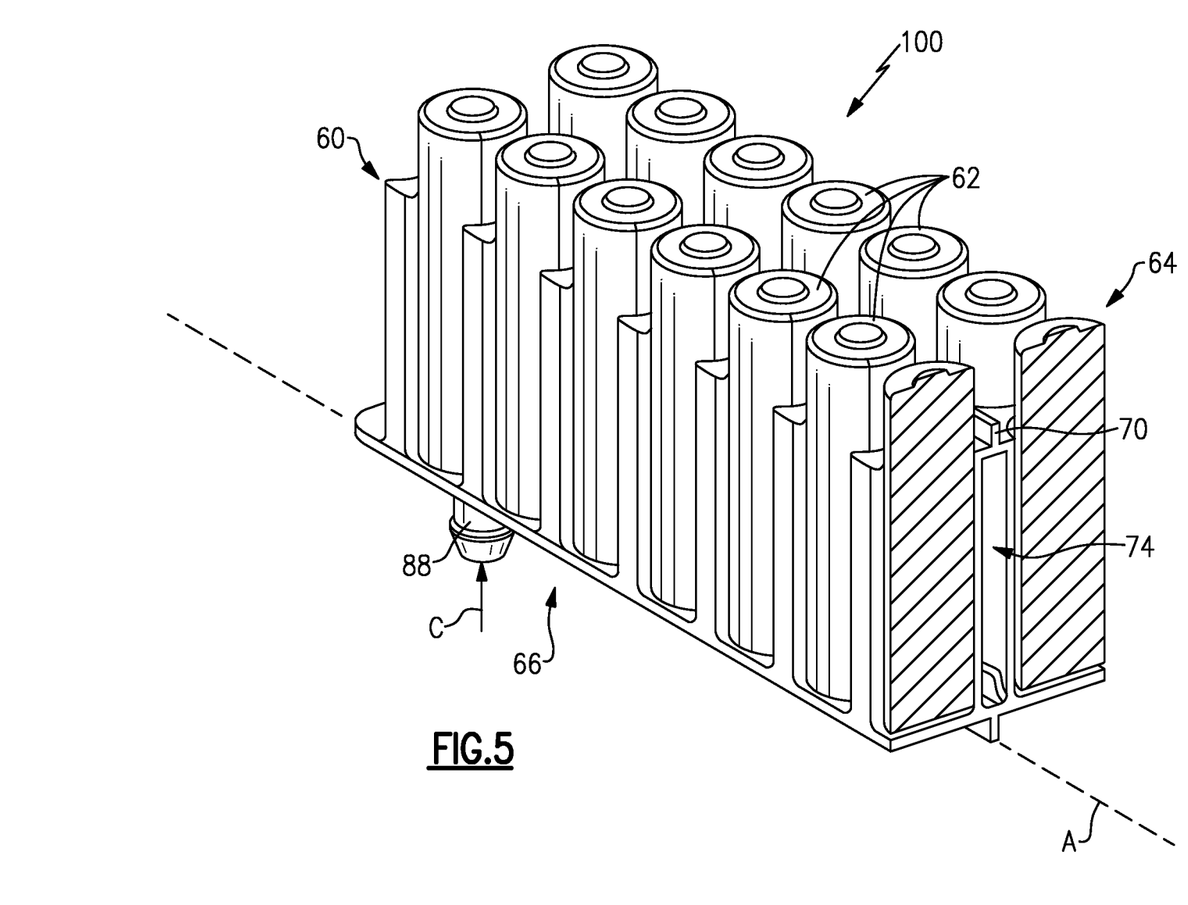
FIG. 5 illustrates a first cross-sectional view through a battery cooling and retainer assembly.
Figure 6:
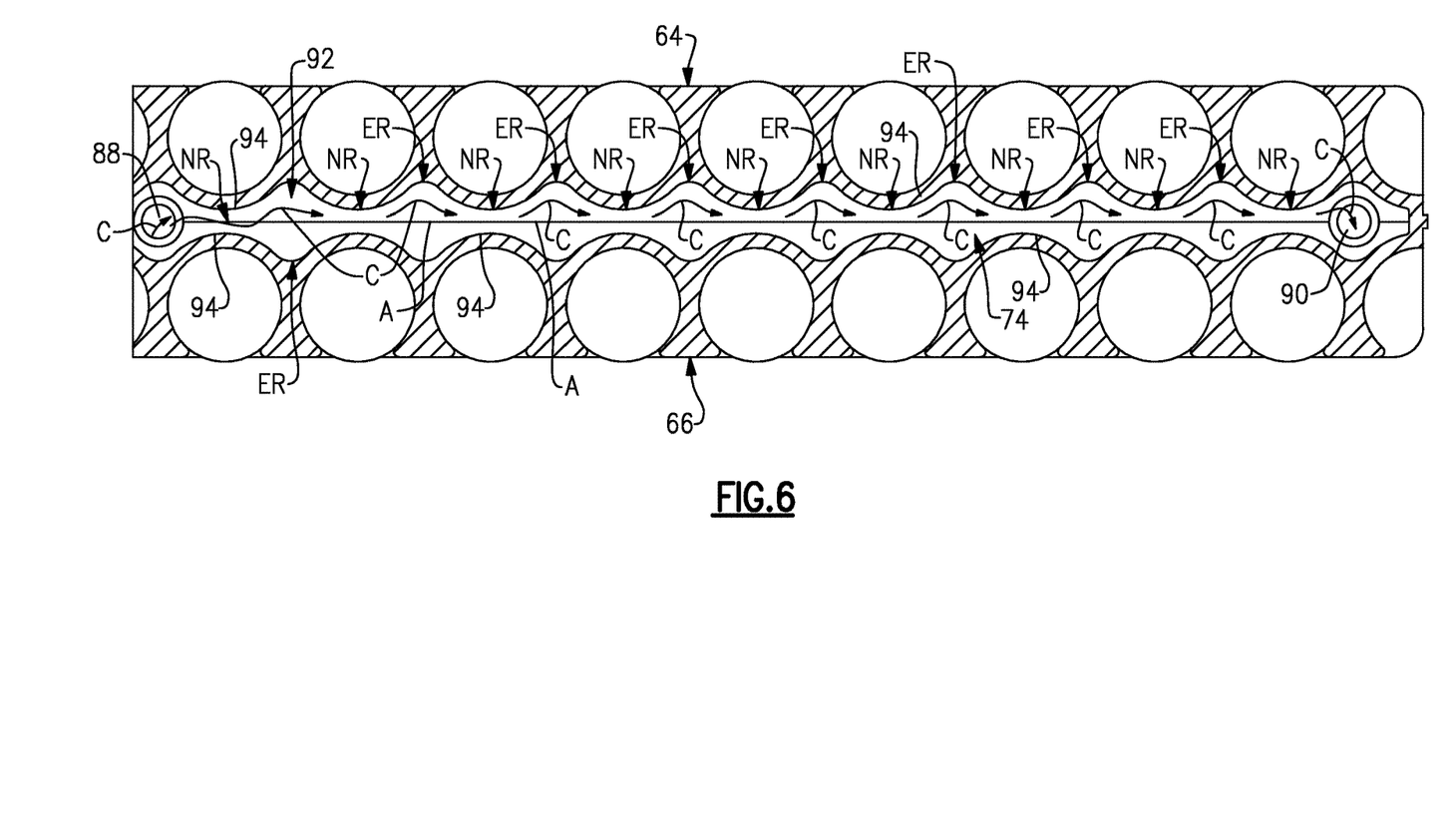
FIG. 6 illustrates a second cross-sectional view through a battery cooling and retainer assembly.

FIGS. 5 and 6, with continued reference to FIGS. 2A, 2B and 3, illustrate additional features of the cooling channel 74 of the assembly 60. In one embodiment, the cooling channel 74 is a hollow space disposed between the first retainer section 64 and the second retainer section 66. The cooling channel 74 may extend in the direction of the longitudinal axis A through a center of the assembly 60. However, it is not necessary for the cooling channel 74 to extend through the exact center of the assembly 60.

The cooling channel 74 is fed with a coolant C via the coolant inlet 88. The coolant C may be sourced from any location of the electrified vehicle. The coolant C may then circulate inside the cooling channel 74 prior to exiting the coolant outlet 90 (see FIG. 3). The coolant C that exits the coolant outlet 90 may be communicated to a manifold (not shown) and returned to its source as part of a closed-loop system.

As best illustrated in the non-limiting embodiment of FIG. 6, the cooling channel 74 extends along an undulated path 92. The undulated path 92 may include a plurality of alternating narrow regions NR and expanded regions ER that extend between opposing interior walls 94 of the first and second retainer sections 64, 66. The expanded regions ER are wider than the narrow regions NR. As the coolant C is circulated along the undulated path 92 through the narrow regions NR and the expanded regions ER, heat is removed from the interior walls 94 to cool the battery cells 62.

Figure 7:
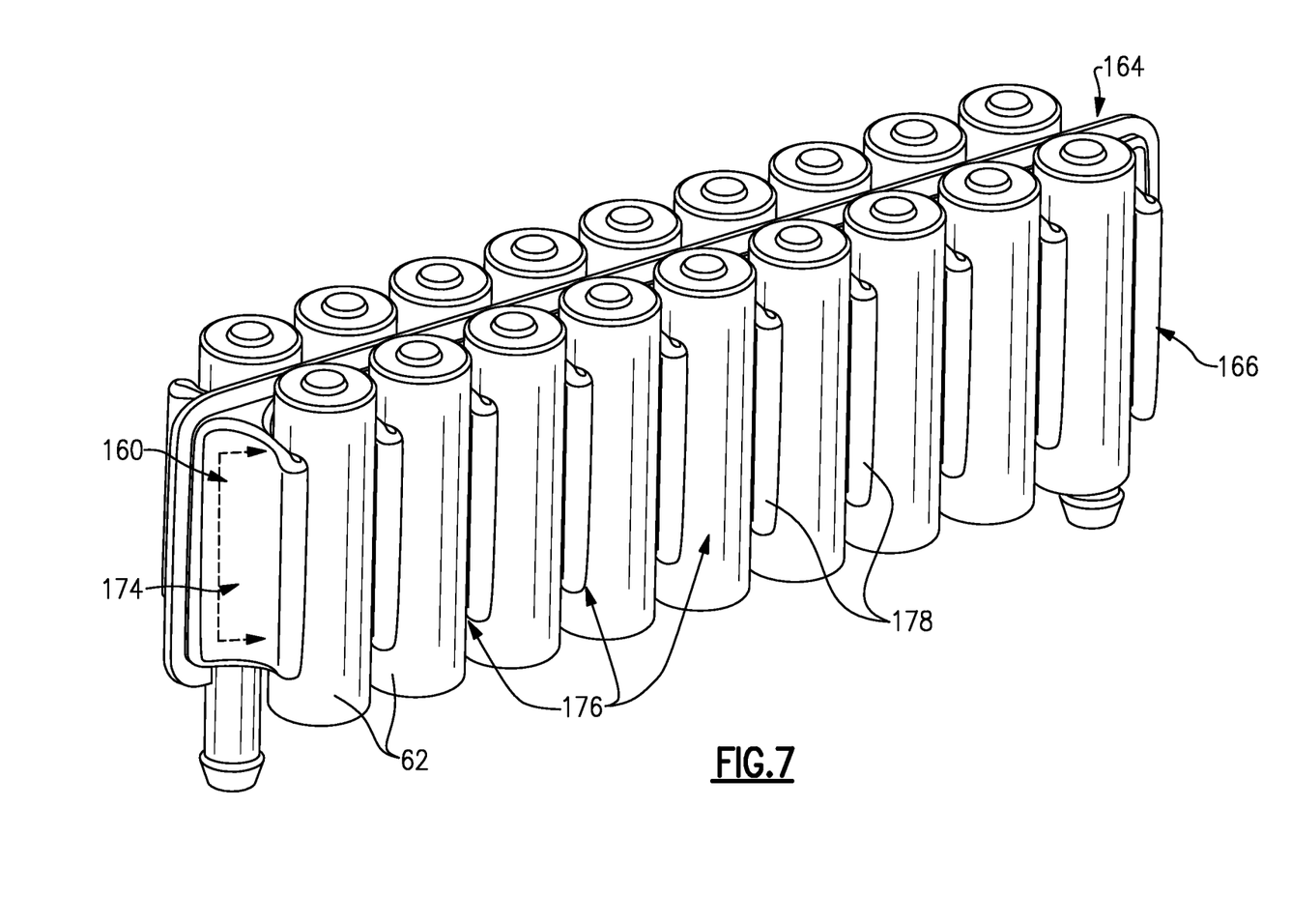
FIG. 7 illustrates a battery cooling and retainer assembly according to another embodiment of this disclosure.

FIG. 7 illustrates another battery cooling and retainer assembly (hereinafter "assembly") 160. In this disclosure, like reference numbers designate like elements where appropriate and reference numerals with the addition of 100 or multiples thereof designate modified elements that are understood to incorporate the same features and benefits of the corresponding original elements.

In this embodiment, the assembly 160 is a blow molded assembly. The assembly 160 is substantially similar to the assembly 60 of FIGS. 2-6. For example, the assembly 160 may include a first retainer section 164, a second retainer section 166, and a cooling channel 174 (shown in phantom) disposed between the first and second retainer sections 164, 166. One or both of the first and second retainer sections 164, 166 may include retention features 176 for holding battery cells 62. However, in this embodiment, the retention features 176 of the assembly 160 exclude shelves (see feature 82 of FIG. 2B). The battery cells 62 of this embodiment are snap-fit in place by spaced apart arms 178.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery cooling and retainer assembly, comprising:
a first retainer section that includes a first retention feature;
a second retainer section that includes a second retention feature; and
a cooling channel disposed between said first retainer section and said second retainer section, and said cooling channel is a hollow space that extends uninterrupted along its entire length, and said first retainer section, said second retainer section, and said cooling channel establish a monolithic assembly, wherein said first retention feature and said second retention feature each include spaced apart arms that establish a pocket and a shelf that extends between said spaced apart arms.

2. The assembly as recited in claim 1, wherein said first retainer section is disposed on a first side of a cooling housing and said second retainer section is disposed on a second, opposite side of said cooling housing.

3. The assembly as recited in claim 2, wherein said cooling channel extends inside of said cooling housing.

4. The assembly as recited in claim 1, wherein said pocket is semi-cylindrical shaped.

5. The assembly as recited in claim 1, wherein said spaced apart arms are flexible between a collapsed position and a flexed position.

6. The assembly as recited in claim 1, wherein said first retainer section and said second retainer section include a plurality of retention features that are configured to hold battery cells.

7. The assembly as recited in claim 1, wherein said cooling channel includes a coolant inlet and a coolant outlet.

8. The assembly as recited in claim 7, wherein said cooling inlet and said cooling outlet extend along an axis that is parallel to a vertical axis of said first retention feature and said second retention feature.

9. The assembly as recited in claim 1, wherein said cooling channel extends along an undulated path.

10. The assembly as recited in claim 9, wherein said undulated path includes a plurality of alternating narrow regions and expanded regions that extend between opposing interior walls of said first retainer section and said second retainer section.

11. The assembly as recited in claim 1, wherein said cooling channel extends along a longitudinal axis of said assembly.

12. The assembly as recited in claim 1, wherein said first retainer section and said second retainer section meet together at a seam.

13. The assembly as recited in claim 1, wherein said shelf extends between outermost edges of said spaced apart arms.

14. A battery module, comprising:
a battery cell; and
a battery cooling and retainer assembly configured to hold said battery cell and cool said battery cell with a coolant communicated inside of said battery cooling and retainer assembly, said battery cooling and retainer assembly including spaced apart arms that vertically span across a distance between an open top and a bottom shelf, said bottom shelf extending between outermost edges of said spaced apart arms.

15. The battery module as recited in claim 14, wherein said battery cooling and retainer assembly includes a first retainer section, a second retainer section and a cooling channel between said first retainer section and said second retainer section.

16. The battery module as recited in claim 1, wherein said cooling channel extends along a longitudinal axis inside of a cooling housing of said battery cooling and retainer assembly.

17. The battery module as recited in claim 14, comprising a plurality of battery cells that are retained within a plurality of pockets of said battery cooling and retainer assembly.

18. The battery module as recited in claim 14, wherein said coolant is communicated along an undulated path inside of said battery cooling and retainer assembly.

19. The battery module as recited in claim 14, wherein said battery cell is positioned atop said bottom shelf.

20. The battery module as recited in claim 19, wherein said bottom shelf is fixedly secured to said spaced apart arms.

21. An electrified vehicle, comprising:
a battery pack that includes a plurality of battery modules, wherein at least one of said plurality of battery modules includes:
   a plurality of battery cells; and
   a battery cooling and retainer assembly that includes a cooling channel and integrated retention features, said cooling channel extending uninterrupted along an undulated path inside of an enclosed housing of said battery cooling and retainer assembly, and said integrated retention features including spaced apart arms and a plurality of shelves connected to said spaced apart arms, said plurality of battery cells resting atop said plurality of shelves to locate said plurality of battery cells at a common height.

22. The electrified vehicle as recited in claim 21, wherein said undulated path includes a plurality of alternating narrow regions and expanded regions that extend between opposing interior walls of said enclosed housing.

23. The electrified vehicle as recited in claim 21, wherein said cooling channel extends uninterrupted across an entire length of said enclosed housing.

24. A battery cooling and retainer assembly, comprising:
a cooling housing;
a cooling channel enclosed inside said cooling housing and extending uninterrupted along an undulated path that includes a plurality of narrow regions and a plurality of expanded regions that are wider than said narrow regions; and
a retainer section on a side of said cooling housing and including flexible spaced apart arms and a shelf extending between said flexible spaced apart arms.

* * * * *